US010493953B2

(12) United States Patent
Arakawa et al.

(10) Patent No.: US 10,493,953 B2
(45) Date of Patent: Dec. 3, 2019

(54) CAR SHARING SYSTEM

(71) Applicant: KABUSHIKI KAISHA TOKAI RIKA DENKI SEISAKUSHO, Aichi (JP)

(72) Inventors: Masahiro Arakawa, Aichi (JP); Masahiko Oya, Aichi (JP); Masaki Oshima, Aichi (JP); Kiyotoshi Sekine, Aichi (JP); Yutaka Kubo, Aichi (JP); Hiroaki Iwashita, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 16/018,237

(22) Filed: Jun. 26, 2018

(65) Prior Publication Data
US 2019/0001925 A1 Jan. 3, 2019

(30) Foreign Application Priority Data
Jun. 29, 2017 (JP) ................................ 2017-127585

(51) Int. Cl.
*B60R 25/24* (2013.01)
*B60W 40/08* (2012.01)
*G07C 9/00* (2006.01)

(52) U.S. Cl.
CPC ............. *B60R 25/24* (2013.01); *B60W 40/08* (2013.01); *G07C 9/00023* (2013.01);
(Continued)

(58) Field of Classification Search
CPC .. B60R 25/24; B60R 2325/205; B60W 40/08; G07C 9/00023; G07C 9/00309; H04W 4/80; H04W 12/06
See application file for complete search history.

(56) References Cited

U.S. PATENT DOCUMENTS

| 6,549,115 | B1 * | 4/2003 | Daiss ...................... B60R 25/24 |
| | | | 123/179.2 |
| 2002/0017978 | A1 * | 2/2002 | Kanda ................ G07C 9/00309 |
| | | | 340/5.61 |

(Continued)

FOREIGN PATENT DOCUMENTS

| JP | 2010-144366 A1 | 7/2010 |
| JP | 2013-121791 A | 6/2013 |

(Continued)

*Primary Examiner* — Orlando Bousono
(74) *Attorney, Agent, or Firm* — Greenblum & Bernstein, P.L.C.

(57) ABSTRACT

A car sharing system includes a car sharing device installed in a vehicle. The car sharing device is configured to perform ID verification via an electronic key system of the vehicle in a state in which key information registered to the mobile terminal has been authenticated to allow an onboard device to be operated by the mobile terminal. The car sharing system includes a key function unit that implements a smart function to perform the ID verification through bidirectional short-range wireless communication with the electronic key system, a determination processing unit that determines whether or not a condition for permitting actuation of the smart function has been satisfied, and an actuation switching unit that validates the smart function if the condition for permitting actuation of the smart function has been satisfied.

10 Claims, 8 Drawing Sheets

(52) U.S. Cl.
CPC . *G07C 9/00309* (2013.01); *B60W 2040/0809* (2013.01); *G07C 2009/0042* (2013.01)

(56) References Cited

U.S. PATENT DOCUMENTS

| | | | |
|---|---|---|---|
| 2003/0102958 A1 | 6/2003 | Gudmundsson | |
| 2010/0071427 A1* | 3/2010 | Tsuruta | B60R 25/241 70/237 |
| 2011/0112969 A1* | 5/2011 | Zaid | G06Q 10/02 705/50 |
| 2012/0303177 A1* | 11/2012 | Jauch | G08C 17/02 701/1 |
| 2012/0313796 A1* | 12/2012 | Lee | B60R 25/2018 340/989 |
| 2015/0324744 A1* | 11/2015 | Fokkelman | G06Q 10/08 705/336 |
| 2016/0012653 A1* | 1/2016 | Soroko | G07C 9/00007 340/5.61 |
| 2016/0140785 A1* | 5/2016 | Lee | B60R 25/2018 701/2 |
| 2016/0241999 A1* | 8/2016 | Chin | H04W 4/021 |
| 2016/0344747 A1* | 11/2016 | Link, II | H04L 63/123 |
| 2017/0011572 A1* | 1/2017 | Link, II | H04L 63/123 |
| 2017/0096123 A1* | 4/2017 | Gennermann | B60R 25/241 |
| 2017/0105101 A1* | 4/2017 | Santavicca | H04B 17/27 |
| 2017/0105120 A1* | 4/2017 | Kang | H04W 4/80 |
| 2017/0178035 A1* | 6/2017 | Grimm | H04L 63/061 |
| 2017/0232931 A1* | 8/2017 | Fernando | B60R 25/24 701/2 |
| 2017/0249791 A1* | 8/2017 | Woo | G07C 9/00111 |
| 2017/0278329 A1 | 9/2017 | Konishi | |

FOREIGN PATENT DOCUMENTS

| | | |
|---|---|---|
| JP | 2016-071834 | 5/2016 |
| JP | 2016-115077 | 6/2016 |

* cited by examiner

CAR SHARING SYSTEM

CROSS-REFERENCE TO RELATED APPLICATIONS

This application is based upon and claims the benefit of priority from prior Japanese Patent Application No. 2017-127585, filed on Jun. 29, 2017, the entire contents of which are incorporated herein by reference.

FIELD

This disclosure relates to a car sharing system in which the same vehicle is shared by a number of people.

BACKGROUND

In a known car sharing system, the same vehicle is shared by a number of people (refer to Japanese Laid-Open Patent Publication No. 2016-115077 and Japanese Laid-Open Patent Publication No. 2016-71834). In such type of a car sharing system, for example, car share user registration is performed in advance to a server or the like. Then, for example, a mobile terminal (smartphone or the like) is used to reserve a vehicle and obtain permission for the use of the vehicle within the reserved time.

SUMMARY

When using a shared car, a user unlocks a vehicle door by performing a remote operation with a mobile terminal. A vehicle 1 notifies the user that the vehicle door has been unlocked through an answerback. This allows the user to locate the used vehicle. However, in such a case, a thief may enter the vehicle and steal the vehicle. Thus, measures need to be taken to cope with such a problem.

One embodiment of a car sharing system includes a car sharing device installed in a vehicle. The car sharing device is configured to perform wireless communication with a mobile terminal that can be actuated as a vehicle key of the vehicle by registering key information, authenticate the key information through the wireless communication, and perform ID verification via an electronic key system of the vehicle in a state in which the key information has been authenticated to allow an onboard device to be operated by the mobile terminal. Further, the car sharing system includes a key function unit arranged in the car sharing device. The key function unit implements a smart function to perform the ID verification through bidirectional short-range wireless communication with the electronic key system. In addition, the car sharing system includes a determination processing unit that determines whether or not a condition for permitting actuation of the smart function has been satisfied. Additionally, the car sharing system includes an actuation switching unit that validates the smart function when the condition for permitting actuation of the smart function has been satisfied.

Other embodiments and advantages thereof will become apparent from the following description, taken in conjunction with the accompanying drawings, illustrating by way of example the principles of the invention.

It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

Figure 1:
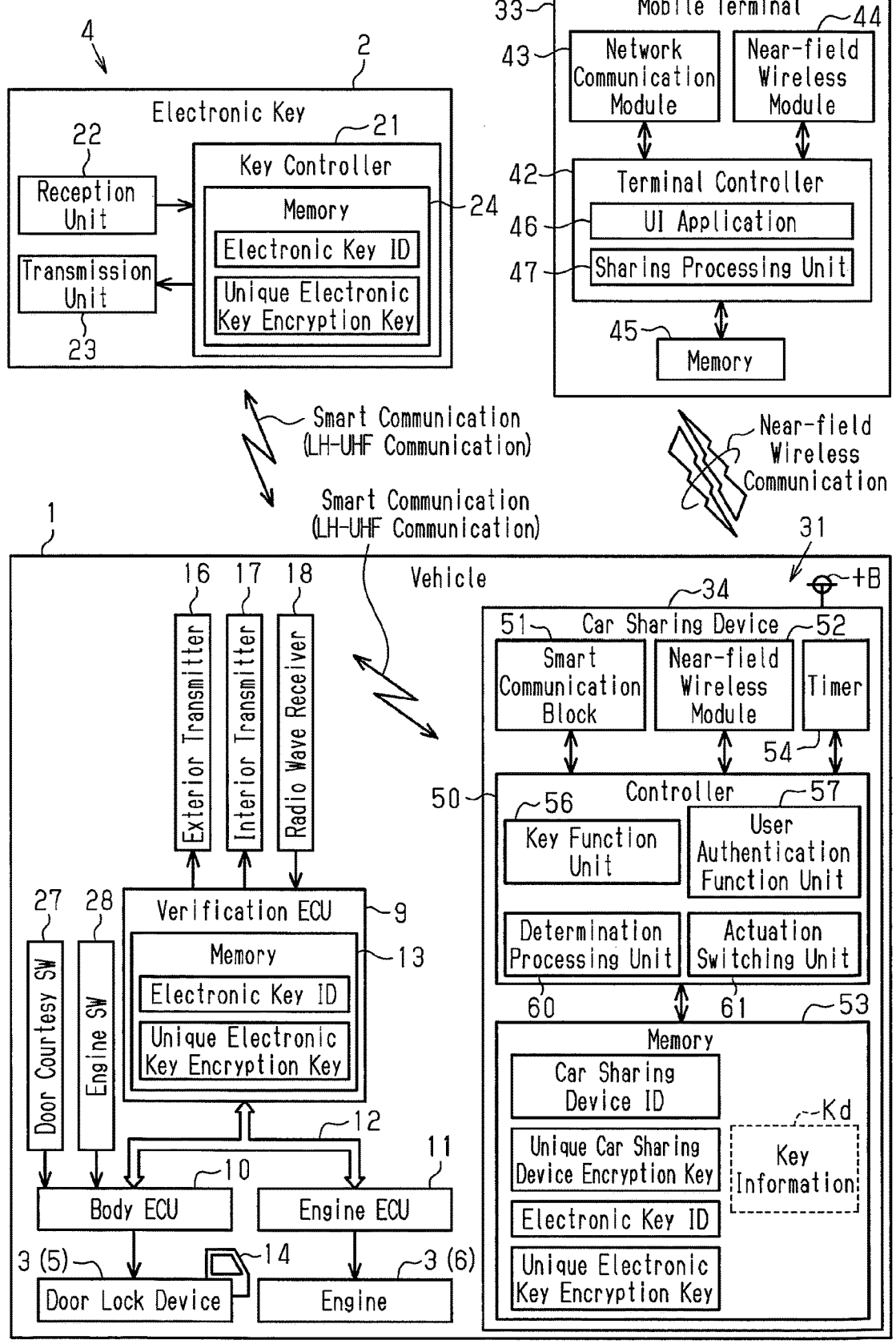
FIG. 1 is a diagram illustrating a first embodiment of a car sharing system.

Embodiments will now be described with reference to the accompanying drawings. Elements in the drawings may be partially enlarged for simplicity and clarity and thus have not necessarily been drawn to scale.

First Embodiment

One embodiment of a car sharing system will now be described with reference to FIGS. 1 to 5.

As illustrated in FIG. 1, the vehicle 1 (shared vehicle) includes an electronic key system 4 that actuates or permits actuation of an onboard device 3 by performing ID verification through wireless communication with an electronic key 2. The electronic key system 4 is a key-operation-free system that performs ID verification through short-range wireless communication in response to communication from the vehicle 1. In the key-operation-free system, ID verification (smart verification) is automatically performed without directly operating the electronic key 2. The onboard device 3 includes, for example, a door lock device 5 and an engine 6.

The vehicle 1 includes a verification electronic control unit 9 (ECU) serving as a verification device that performs ID verification. Further, the vehicle 1 includes a body ECU 10 that manages the power supply for onboard electrical components and an engine ECU 11 that controls the engine 6. The ECUs 9 to 11 are electrically connected to one another by a communication line 12 in the vehicle. The communication line 12 is, for example, a controller area network (CAN) or a local interconnect network (LIN). The verification ECU 9 includes a memory 13. The electronic key 2 of the vehicle 1 has a unique electronic key ID registered to the memory 13. The body ECU 10 controls the door lock device 5 that locks and unlocks a vehicle door 14.

The vehicle 1 includes an exterior transmitter 16 that can transmit radio waves out of the passenger compartment, an interior transmitter 17 that can transmit radio waves into the passenger compartment, and a radio wave receiver 18 that can receive radio waves in the vehicle 1. The exterior transmitter 16 and the interior transmitter 17 transmit low frequency (LF) band radio waves. The radio wave receiver 18 receives ultrahigh frequency (UHF) band radio waves.

Thus, the electronic key system 4 of the present example performs bidirectional LF-UHF communication.

The electronic key 2 includes a key controller 21 that controls actuation of the electronic key 2, a reception unit 22 that receives radio waves in the electronic key 2, and a transmission unit 23 that transmits radio waves from the electronic key 2. The reception unit 22 can receive LF radio waves. The transmission unit 23 can transmit UHF radio waves. The key controller 21 includes a memory 24. The electronic key ID of the electronic key 2 is registered to the memory 24.

When the vehicle is parked, the exterior transmitter 16 transmits a wake signal on the LF radio waves. When entering a communication area of the wake signal, the electronic key 2 is activated from a standby mode in response to the wakeup signal. Then, the verification ECU 9 starts ID verification (in this case, exterior smart verification), which is referred to as smart verification, through communication (bidirectional short-range wireless communication) with the activated electronic key 2. The smart verification includes, for example, electronic key ID verification that checks whether or not the electronic key ID is correct and challenge response authentication that uses an encryption key unique to the electronic key 2 (hereinafter, referred to as "a unique electronic key encryption key"). If the electronic key ID verification and the challenge response authentication are accomplished, the verification ECU 9 determines that the smart verification has been accomplished and performs or permits locking and unlocking of the vehicle door 14 with the body ECU 10.

The verification ECU 9 uses a door courtesy switch 27 or the like to detect the user entering the vehicle. If the user entering the vehicle is detected, a wake signal is transmitted from the interior transmitter 17 instead of the exterior transmitter 16. When the electronic key 2 receives the wake signal, the verification ECU 9 starts ID verification (in this case, interior smart verification) in the same manner as exterior smart verification. When the verification ECU 9 acknowledges accomplishment of the interior smart verification, the verification ECU 9 permits shifting of the power supply state (for example, starting of the engine) with an engine switch 28 located near the driver seat.

The vehicle 1 includes a car sharing system 31 so that the same vehicle 1 can be shared with a number of people. In the present example, the car sharing system 31 includes a car sharing device 34 installed in the vehicle 1 serving as a shared vehicle. The car sharing device 34 includes an encryption key (hereinafter, referred to as "a unique car sharing device encryption key") that allows for decryption of key information Kd registered to a mobile terminal 33. The mobile terminal 33 obtains the encrypted key information Kd from a server (not illustrated) and registers the key information Kd to the mobile terminal 33. This allows the mobile terminal 33 to be actuated as a vehicle key (electronic key) of the vehicle 1. The car sharing device 34 receives key information Kd from the mobile terminal 33 through wireless communication and authenticates the key information Kd. When the key information Kd is authenticated, the car sharing device 34 allows the onboard device 3 to be operated by the mobile terminal 33.

The car sharing device 34 is independent from the hardware configuration of the electronic key system 4 of the vehicle 1 and is retrofitted to the vehicle 1. The car sharing device 34 functions as, for example, an electronic key that is valid only during the reserved time and is used in the same manner as a spare key. The car sharing device 34 is configured to switch between states in which an electronic key function of the car sharing device 34 is valid and invalid. The verification ECU 9 of the electronic key system 4 switches the electronic key function of the car sharing device 34 between valid and invalid states to recognize the generation and elimination of an electronic key in the vehicle 1. The car sharing device 34 is supplied with power from a battery +B of the vehicle 1.

The mobile terminal 33 includes a terminal controller 42 that controls actuation of the mobile terminal 33, a network communication module 43 that enables network communication of the mobile terminal 33, a near-field wireless module 44 that enables near-field wireless communication of the mobile terminal 33, and a data-rewritable memory 45. A user authentication key used to perform near-field wireless communication with the car sharing device 34 in an encryption communication mode is registered to the memory 45 of the mobile terminal 33. Near-field wireless communication is, for example, Bluetooth (registered trademark). The user authentication key may be, for example, a random number of which value is varied whenever generated. The user authentication key may be registered in advance to the car sharing system 31. Alternatively, the user authentication key may be generated when the vehicle 1 is used and registered to a certain member.

The mobile terminal 33 includes a user interface application 46 that manages actuation of the car sharing system 31 in the mobile terminal 33 and a sharing processing unit 47 that executes a sharing process of the vehicle 1 in the mobile terminal 33. The sharing processing unit 47 is a function implemented when, for example, the terminal controller 42 executes the user interface application 46.

The car sharing device 34 includes a controller 50 that controls actuation of the car sharing device 34, a smart communication block 51 that enables smart communication with the car sharing device 34, a near-field wireless module 52 that enables near-field wireless communication with the car sharing device 34, a data-rewritable memory 53, and a timer 54 that manages date and time in the car sharing device 34. A car sharing device ID and a unique car sharing device encryption key are registered in advance to the memory 53. The timer 54 includes, for example, a soft timer.

Further, key information Kd is registered to the memory 53 of the car sharing device 34. For example, key information Kd is generated by a server (not illustrated) and registered to the car sharing device 34 from the server via the mobile terminal 33. The key information Kd can only be temporarily used. For example, key information Kd may be a one-time key of which use is permitted only once.

The car sharing device 34 includes a key function unit 56, a user authentication function unit 57, a determination processing unit 60, and an actuation switching unit 61. In one non-restrictive example, the key function unit 56, the user authentication function unit 57, the determination processing unit 60, and the actuation switching unit 61 are functions implemented by the controller 50 that executes one or more programs stored in a storage area such as the memory 53. The key function unit 56 performs ID verification (verification of electronic key ID) by communicating with the verification ECU 9 via the smart communication block 51. For example, the key function unit 56 may perform ID verification through UHF communication with the verification ECU 9. Further, the key function unit 56 may perform ID verification (smart verification) through LF-UHF communication (smart communication) with the verification ECU 9. The key function unit 56 performs ID verification through the same process as the process performed between the electronic key 2 and the verification ECU 9. Then, when the ID verification is accomplished, the key function unit 56 permits operation of the onboard device 3 of the vehicle 1, which is shared by a number of people.

The user authentication function unit 57 executes wireless communication with the mobile terminal 33 when the onboard device 3 is remotely operated by the mobile terminal 33. The user authentication function unit 57 obtains key information Kd generated by an external device (for example, server) via the mobile terminal 33 when the onboard device 3 is operated by the mobile terminal 33. When authentication of the key information Kd is accomplished and the vehicle 1 is used within the reserved time, the user authentication function unit 57 validates the key function unit 56 and allows the onboard device 3 to be operated by the mobile terminal 33.

The determination processing unit 60 determines whether or not a condition for permitting actuation of a smart function of the key function unit 56 has been satisfied. The smart function of the key function unit 56 may be defined as a function in which the car sharing device 34, which functions as the electronic key, performs ID verification with the verification ECU 9 through bidirectional short-range wireless communication (smart communication). In one non-restrictive example, when the car sharing device 34 receives an actuation permission request from the mobile terminal 33 that requests for actuation permission of the onboard device 3 in a state in which the vehicle door 14 is unlocked, the determination processing unit 60 determines that the condition for permitting actuation of the smart function has been satisfied. In the present example, the actuation permission request is an engine start permission request that requests the engine 6 of the vehicle 1 to be started.

The actuation switching unit 61 switches the smart function of the key function unit 56 between valid and invalid states based on the determination result of the determination processing unit 60. The actuation switching unit 61 enables the smart function when the condition for permitting actuation of the smart function of the key function unit 56 has been satisfied.

The operation of the car sharing system 31 will now be described with reference to FIGS. 2 to 5.

Figure 2:
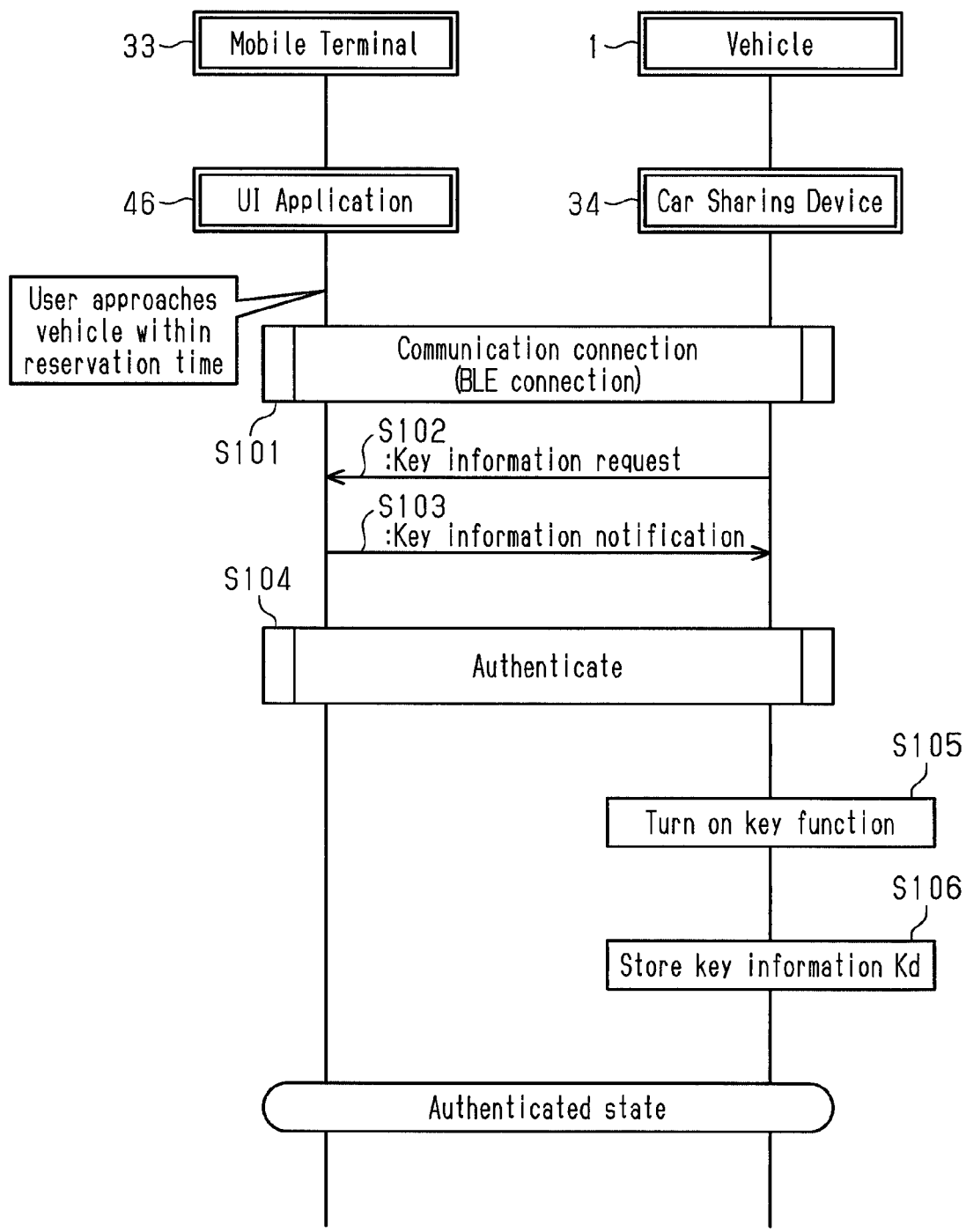
FIG. 2 is a flowchart illustrating a user authentication sequence.

FIG. 2 illustrates a key information authentication (user authentication) sequence. An electronic key ID and a unique electronic key encryption key are registered in advance to each of the memory 13 of the verification ECU 9 and the memory 53 of the car sharing device 34. In addition, key information Kd (one-time key) obtained from the server is registered in advance to the memory 45 of the mobile terminal 33.

In step S101, near-field wireless communication is established between the mobile terminal 33 and the car sharing device 34. In one non-restrictive example, the sharing processing unit 47 and the user authentication function unit 57 execute communication connection in order to establish Bluetooth Low Energy (BLE) communication. In this case, when advertising packets transmitted regularly from the car sharing device 34 are received, the mobile terminal 33 transmits a communication connection request to the car sharing device 34. When the car sharing device 34 transmits a communication connection acknowledgement to the mobile terminal 33, BLE communication is established between the mobile terminal 33 and the car sharing device 34.

In step S102, when communication connection (BLE connection) has been completed, the user authentication function unit 57 transmits a key information request to the mobile terminal 33 and requests the mobile terminal 33 to send the key information Kd. The key information request may be defined as a request to start use of the shared vehicle 1.

In step S103, the sharing processing unit 47 transmits the key information Kd to the car sharing device 34 in response to the key information request. In the present example, the key information Kd is encrypted by the encryption key (for example, unique car sharing device encryption key) registered to the car sharing system 31 and then transmitted.

In step S104, the sharing processing unit 47 and the user authentication function unit 57 authenticate the key information Kd. In the present example, in authentication, a decryption process of the key information Kd and a confirmation process (key information authentication) for confirming whether or not various parameters included in the key information Kd are correct are executed. When the key information authentication is accomplished, the process proceeds to step S105. If the key information authentication fails, the connection of BLE communication stops.

In step S105, after the accomplishment of the key information authentication, the user authentication function unit 57 activates (validates) the key function unit 56. This allows the car sharing device 34 to perform LF-UHF bidirectional communication with the verification ECU 9.

In step S106, the user authentication function unit 57 stores the key information Kd in the memory 53 of the car sharing device 34 and shifts to an authenticated state. In the authenticated state, the car sharing device 34 sets a rental flag (not illustrated) stored in the memory 53 to a value indicating that the vehicle 1 is being used. This allows the car sharing device 34 to perform operation such as locking and unlocking of the vehicle door 14 or starting of the engine 6.

Figure 3:
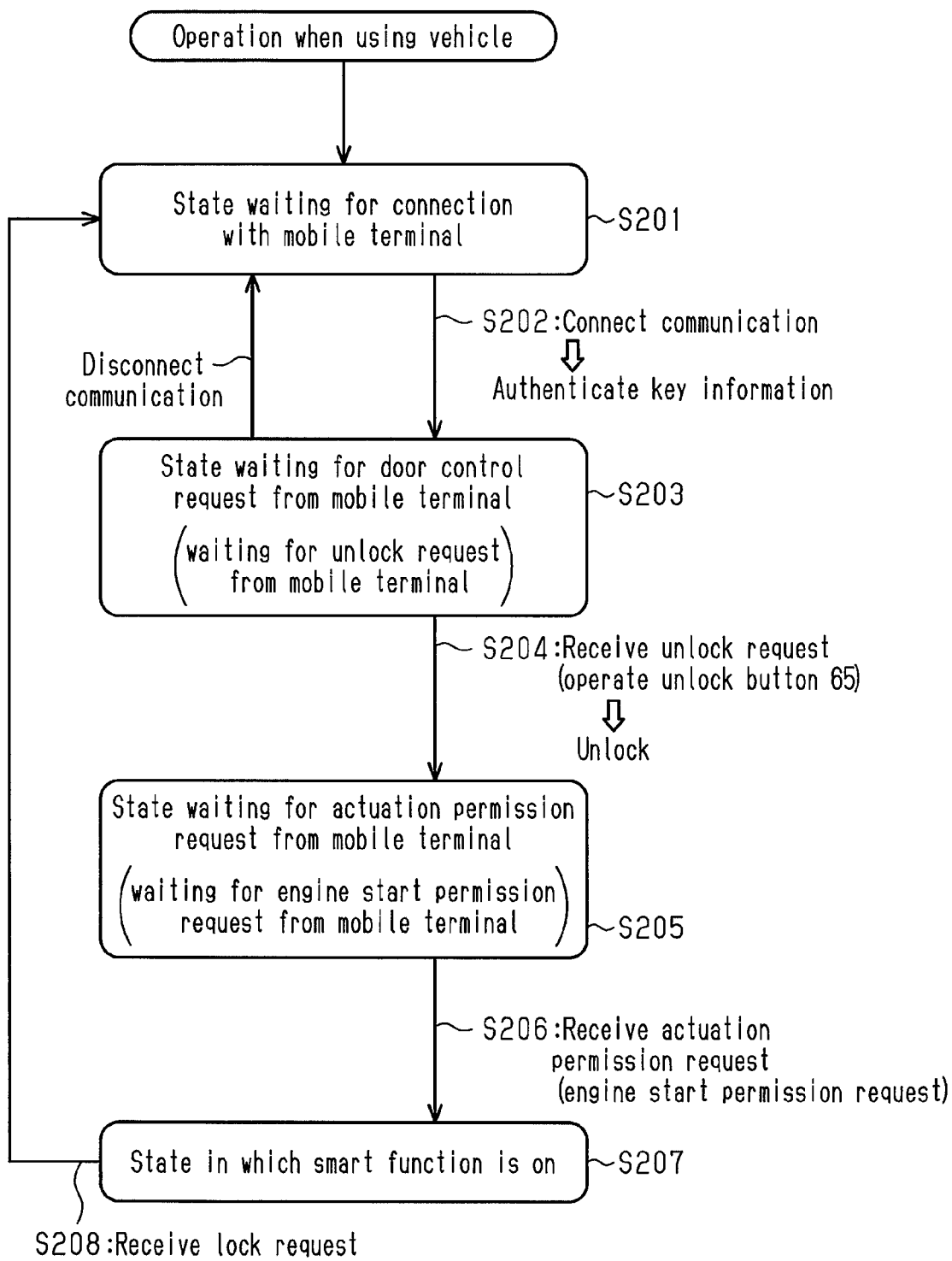
FIG. 3 is a flowchart illustrating an operation sequence that validates a smart function.

FIG. 3 illustrates an operation sequence when using the vehicle. The illustrated case is an example in which the vehicle 1 is in a parked state (door-locked state and engine-stopped state). In this state, the vehicle door 14 is unlocked and the engine 6 is started. Whenever the sharing of the vehicle 1 is started or whenever the engine 6 is started, it is preferred that the determination processing unit 60 and the actuation switching unit 61 perform a series of processes (for example, operation sequence illustrated in FIG. 3) to determine whether or not the condition for permitting actuation of the smart function has been satisfied and validate the smart function when the condition has been satisfied.

In step S201, before starting use of the vehicle 1, the user authentication function unit 57 is in a state waiting for connection with the mobile terminal 33 (waiting for communication connection). In the present example, the car sharing device 34 regularly transmits advertising packets and monitors whether or not the mobile terminal 33 exists around the vehicle 1.

In step S202, the user authentication function unit 57 performs communication connection with the mobile terminal 33. When communication is established between the mobile terminal 33 and the car sharing device 34, the mobile terminal 33 and the car sharing device 34 execute the same process as the above process of the key information authentication illustrated in FIG. 2. When the key information authentication is accomplished, the mobile terminal 33 and the car sharing device 34 shift to an authenticated state. Then, the process proceeds to step S203.

In step S203, the key function unit 56 waits for the mobile terminal 33 to transmit a door control request. The door control request is an unlock request or a lock request from the mobile terminal 33. For example, when the vehicle 1 is in the parked state (door-locked state and engine-stopped state), the key function unit 56 waits for the mobile terminal 33 to transmit the unlock request. Even if the key function unit 56 is shifted to the door control standby state (step S203), the smart function of the key function unit 56 still remains inactivated (invalidated). When the BLE communication is disconnected in the door control request standby state, the process returns to step S201.

In step S204, when the unlock request is received from the mobile terminal 33, the key function unit 56 starts unlocking the vehicle door 14. The unlock request is transmitted from the mobile terminal 33 to the car sharing device 34 when, for example, an unlock button 65 displayed on a screen of the mobile terminal 33 is operated. For example, the unlock request is encrypted by an encryption key (for example, unique car sharing device encryption key) registered to the car sharing system 31 and then transmitted.

When the unlock request (door control request) is received from the mobile terminal 33, the key function unit 56 transmits the unlock request including an electronic key ID on UHF radio waves from the smart communication block 51 to the verification ECU 9 through a communication network (UHF communication) of the car sharing device 34. The transmission of the unlock request from the car sharing device 34 to the verification ECU 9 differs from the ID verification (smart verification) performed through smart communication (LF-UHF communication). That is, the smart function still remains inactivated (invalidated).

When an unlock request is received from the car sharing device 34, the verification ECU 9 transmits the unlock request to the body ECU 10 via the communication line 12. When the unlock request is received from the verification ECU 9, the body ECU 10 controls the door lock device 5 and switches the vehicle door 14 from the lock state to the lock state. This unlocks the vehicle door 14 and allows the user to enter the vehicle.

When receiving an unlock request from the mobile terminal 33, the user authentication function unit 57 increments the logging of the unlock request. After incrementing the logging of the unlock request, the user authentication function unit 57 transmits an unlock transmission notification (door control notification) to the mobile terminal 33. The unlock transmission notification indicates that the car sharing device 34 has transmitted the unlock request to the verification ECU 9 (electronic key system 4). For example, the unlock transmission notification is encrypted by an encryption key (for example, unique car sharing device encryption key) registered to the car sharing system 31 and then transmitted from the car sharing device 34 to the mobile terminal 33. When the unlock transmission notification is received from the car sharing device 34, the sharing processing unit 47 displays a message indicating that the unlock request has been transmitted on the screen of the mobile terminal 33. When the vehicle door 14 is shifted to the unlock state, the process proceeds to step S205.

In step S205, the car sharing device 34 waits for the mobile terminal 33 to transmit an actuation permission request. In the present example, the car sharing device 34 waits for the mobile terminal 33 to transmit an engine start permission request. The engine start permission request is transmitted from the mobile terminal 33 when an engine start request operation is performed on the mobile terminal 33. Even if the car sharing device 34 is shifted to an engine start permission request standby state (step S205), the smart function of the key function unit 56 still remains inactivated (invalidated).

The determination processing unit 60 determines whether or not the condition for permitting actuation of the smart function of the key function unit 56 has been satisfied. In the present example, when the car sharing device 34 receives the engine start permission request from the mobile terminal 33 in a state in which the vehicle door 14 is unlocked, the condition for permitting actuation of the smart function is satisfied. Thus, the determination processing unit 60 monitors whether or not the car sharing device 34 has received the engine start permission request from the mobile terminal 33 in the state in which the vehicle door 14 is unlocked.

When the user wishes to start the engine 6, the user uses the user interface application 46 to display an engine start button (not illustrated) on the screen of the mobile terminal 33. When the sharing processing unit 47 determines that the user has operated the engine start button of the mobile terminal 33, the sharing processing unit 47 transmits the engine start permission request to the car sharing device 34 through Bluetooth communication (in the present example, BLE communication).

In step S206, when the determination processing unit 60 determines that the car sharing device 34 has received the engine start permission request from the mobile terminal 33, the determination processing unit 60 determines that the condition for actuating the smart function of the key function unit 56 has been satisfied. This allows the smart function of the key function unit 56 to be switched from the inactivated (invalidated) state to an activated (validated) state.

In step S207, the actuation switching unit 61 activates (validates) the smart function of the key function unit 56. This shifts the car sharing device 34 to a smart communication function valid state and allows ID verification (smart verification) to be performed through smart communication with the verification ECU 9 of the electronic key system 4.

Figure 4:
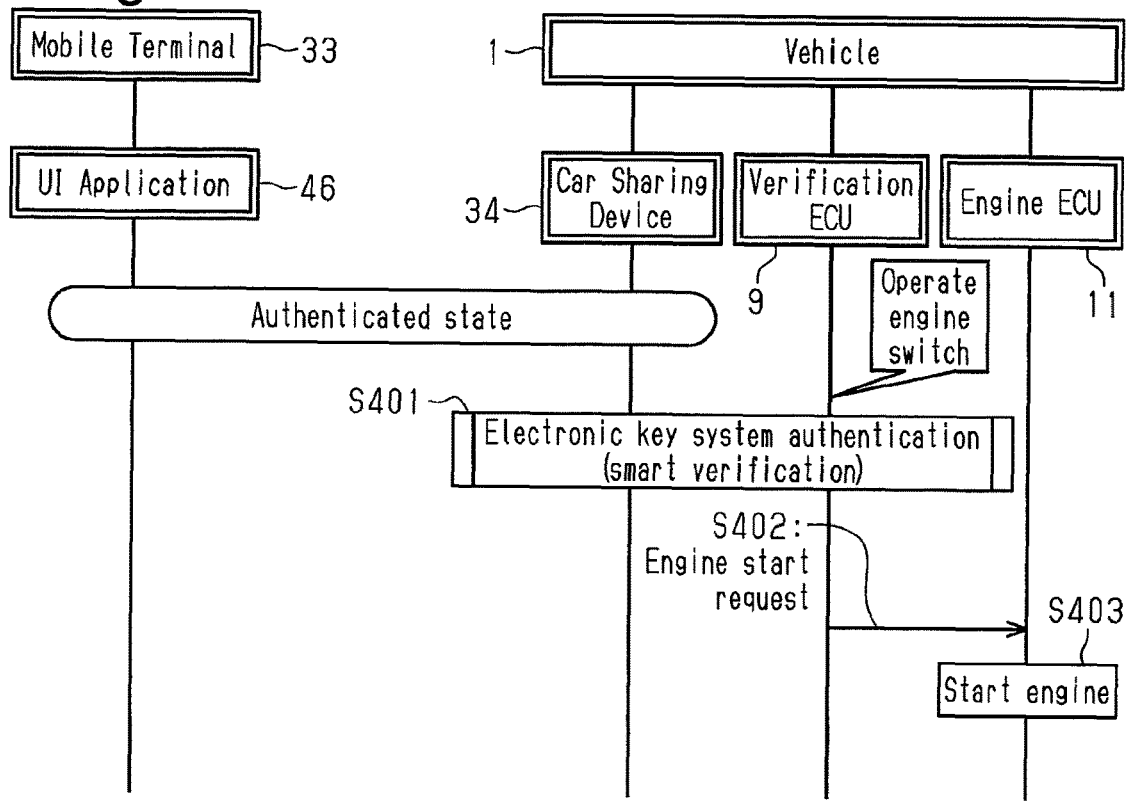
FIG. 4 is a sequence chart illustrating a process for starting a vehicle engine through smart verification.

FIG. 4 illustrates a sequence when starting the engine 6 of the vehicle 1 through smart verification. To start the engine 6, the user presses the engine switch 28 of the driver seat while, for example, operating a brake.

When the car sharing device 34 and the mobile terminal 33 (user interface application 46) are in an authenticated state and the smart function of the key function unit 56 is valid (refer to FIG. 3), the verification ECU 9 can perform ID verification (smart verification) through smart communication with the car sharing device 34. The smart verification of the car sharing device 34 is performed in the same manner as the smart verification of the electronic key 2 of the electronic key system 4.

In step S401, when the verification ECU 9 determines that the brake and the engine switch 28 have been operated, the verification ECU 9 uses the smart function of the key function unit 56 to execute smart verification of the car sharing device 34.

The verification ECU 9 transmits a wake signal on the LF radio waves from the interior transmitter 17. The car sharing device 34 sends back an acknowledgement signal to the verification ECU 9 in response to the wake signal. When the acknowledgement signal is received, the verification ECU 9 starts smart verification of the car sharing device 34. In the smart verification, the verification ECU 9, for example, verifies the electronic key ID registered to the memory 53 and or performs challenge response authentication using a unique electronic key encryption key registered to the memory 53 in the same manner as the smart verification of the electronic key 2. When determining that smart verification has been accomplished, the verification ECU 9 permits starting of the engine 6.

In step S402, the verification ECU 9 outputs an engine start request to the engine ECU 11 via the communication line 12.

In step S403, the engine ECU 11 starts the engine 6 in response to the engine start request from the verification ECU 9.

Subsequently, when the engine switch 28 is pressed while the engine 6 is running, the engine 6 stops. After the engine 6 stops, the body ECU 10 uses the door courtesy switch 27 to determine whether or not the user has exited the vehicle. When the body ECU 10 determines that the user has exited the vehicle, the car sharing device 34 waits for the mobile terminal 33 to transmit a lock request (door control request). That is, the car sharing device 34 monitors whether or not the user has locked the vehicle door 14 with the mobile terminal 33.

Figure 5:
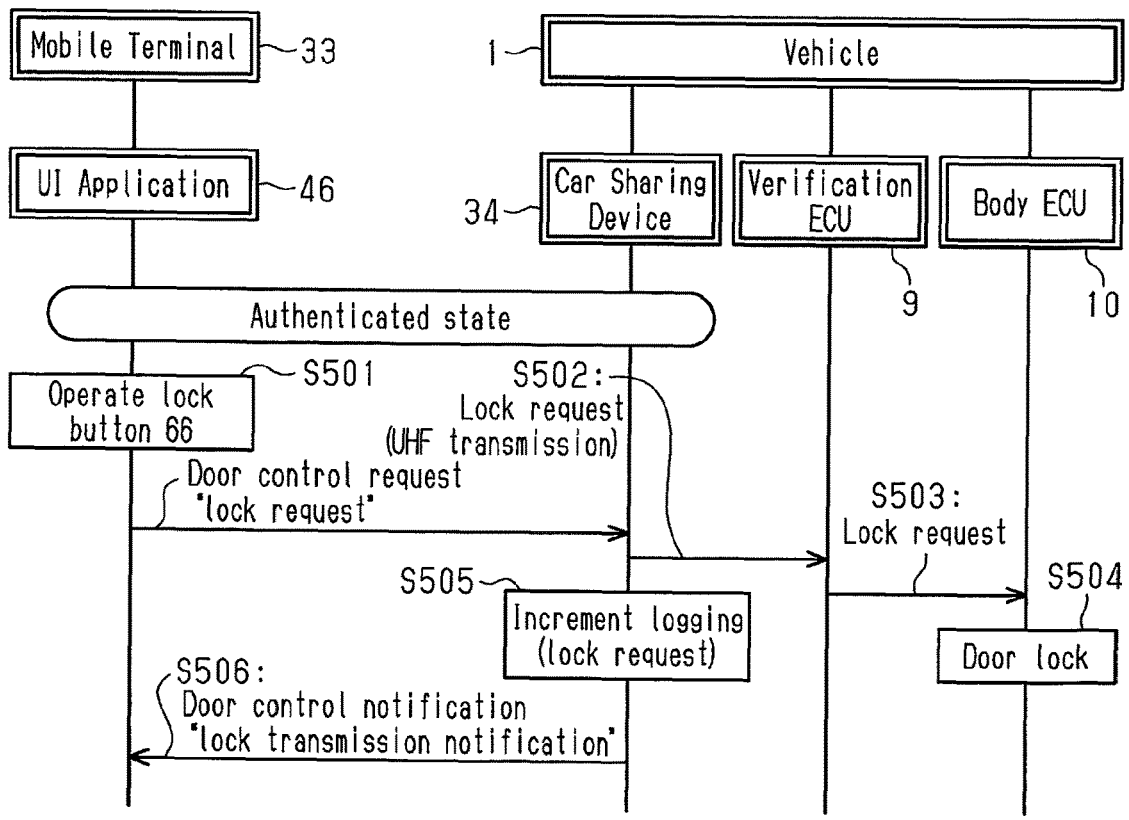
FIG. 5 is a sequence chart illustrating a process for locking a vehicle door.

FIG. 5 illustrates a sequence for locking the vehicle door 14. When the car sharing device 34 is waiting for a lock request, a lock button 66 that locks the vehicle door 14 is displayed on the screen of the mobile terminal 33 by the user interface application 46.

In step S501, when the sharing processing unit 47 determines that the lock button 66 on the screen of the mobile terminal 33 has been operated in the authenticated state, the sharing processing unit 47 transmits a lock request of the vehicle door 14 (door control request) to the car sharing device 34. For example, the lock request is encrypted by the encryption key (for example, unique car sharing device encryption key) registered to the car sharing system 31 and then transmitted.

In step S502, when a lock request is received from the mobile terminal 33, the key function unit 56 of the car sharing device 34 transmits the lock request including the electronic key ID on UHF radio waves via the communication network (UHF communication) of the car sharing device 34 from the smart communication block 51 to the verification ECU 9.

In step S503, when the lock request is received from the car sharing device 34, the verification ECU 9 transmits the lock request to the body ECU 10 via the communication line 12.

In step S504, when the lock request is received from the verification ECU 9, the body ECU 10 controls the door lock device 5 and switches the vehicle door 14 from the unlock state to the lock state. This locks the vehicle door 14 and shifts the vehicle 1 to the parked state.

In step S505, when the user authentication function unit 57 receives the lock request from the mobile terminal 33, the user authentication function unit 57 increments the logging of the lock request.

In step S506, after incrementing the logging of the lock request, the user authentication function unit 57 transmits a lock transmission notification (door control notification) to the mobile terminal 33. The lock transmission notification indicates that the car sharing device 34 has transmitted the lock request to the verification ECU 9 (electronic key system 4). For example, the lock transmission notification is encrypted by the encryption key (for example, unique car sharing device encryption key) registered to the car sharing system 31 and then transmitted to the mobile terminal 33. When the lock transmission notification is received from the car sharing device 34, the sharing processing unit 47 displays a message on the screen of the mobile terminal 33 indicating that the lock request has been transmitted.

Referring to FIG. 3, in step S208, when the car sharing device 34 receives a lock request from the mobile terminal 33 in a state in which the vehicle door 14 is unlocked and then transmits the lock transmission notification to the mobile terminal 33, the car sharing device 34 shifts back to a state waiting for connection with the mobile terminal 33 (step S201). This returns the smart function of the key function unit 56 from an activated (validated) state to an inactivated (invalidated) state.

The car sharing system 31 has the advantages described below.

The car sharing system 31 includes the car sharing device 34 that allows the onboard device 3 to be operated by the mobile terminal 33. The car sharing device 34 includes the key function unit 56 that implements the smart function. The smart function of the key function unit 56 becomes valid when a certain condition is satisfied. In the present example, the smart function of the key function unit 56 is validated when the car sharing device 34 receives the engine start permission request from the mobile terminal 33. As a result, the car sharing device 34 performs smart verification (ID verification through smart communication with verification ECU 9) to allow the mobile terminal 33 to operate the onboard device 3. Thus, in the present example, in order to operate the vehicle 1 with the mobile terminal 33, the user is required to perform an operation for validating the smart function. Accordingly, the security is improved when using the shared vehicle 1 as compared to when the smart function is validated in a non-conditional manner.

When the user starts sharing the vehicle 1 (when user starts using shared vehicle 1), the user performs an unlock operation with the mobile terminal 33 to unlock the vehicle door 14. Then, the vehicle 1 notifies the user that the vehicle door 14 has been unlocked through an answerback so that the user can locate the used vehicle (vehicle 1) based on the answerback. In this case, there would be no problem if the user can immediately enter the vehicle. However, a thief may use the opportunity to enter and drive the vehicle 1 away. In the present example, even if the vehicle door 14 is unlocked, the smart function of the key function unit 56 is not validated as long as the engine start permission request is not transmitted from the mobile terminal 33. Thus, a thief will not be able to start the engine 6 through smart verification. This prevents the vehicle 1 from being stolen.

The car sharing device 34 is connected through wireless communication to the electronic key system 4 and not wire-connected to the electronic key system 4. This allows the car sharing device 34 to be easily retrofitted to the vehicle 1.

In the present example, whenever sharing of the vehicle 1 is started or whenever the engine 6 is started, when determined that the condition for validating the smart function has been satisfied, the determination processing unit 60 and the actuation switching unit 61 perform a series of processes to validate the smart function. Thus, when using the vehicle 1 (shared vehicle), the user is required to perform a certain operation for validating the smart function. In other words, when the certain operation is not performed, the smart function remains invalidated. This is further advantageous for ensuring security when using the vehicle 1.

In the present example, when the car sharing device 34 receives an actuation permission request from the mobile terminal 33 requesting for actuation permission of the onboard device 3 in a state in which the vehicle door 14 is unlocked, the determination processing unit 60 determines that the condition for actuating the smart function has been satisfied. Thus, in order to operate the onboard device 3 of the vehicle 1 with the mobile terminal 33 through the car sharing system 31, the user needs to operate the mobile terminal 33 and transmit the actuation permission request to the car sharing device 34. This requires the user to perform an additional operation on the mobile terminal 33 and makes it difficult for a vehicle operation to be performed without the user intending to do so.

In the present example, the actuation permission request is the engine start permission request that requests the engine 6 of the vehicle 1 to be started. Thus, the smart function of the car sharing device 34 (key function unit 56) is not validated unless the user operates the mobile terminal 33 to transmit the engine start permission request from the mobile terminal 33 to the car sharing device 34. That is, the smart function is not validated as long as a certain operation for starting the engine 6 is not performed. Accordingly, this is further advantageous for limiting vehicle operations that the user does not intend to perform.

Second Embodiment

A second embodiment will now be described with reference to FIGS. 6 and 7. In the second embodiment, the condition for validating the smart communication function is changed from that of the first embodiment. Thus, like or same reference numerals are given to those components that are the same as the corresponding components of the first embodiment. Such components will not be described in detail. Instead, only components that differ from those of the first embodiment will be described in detail.

Figure 6:
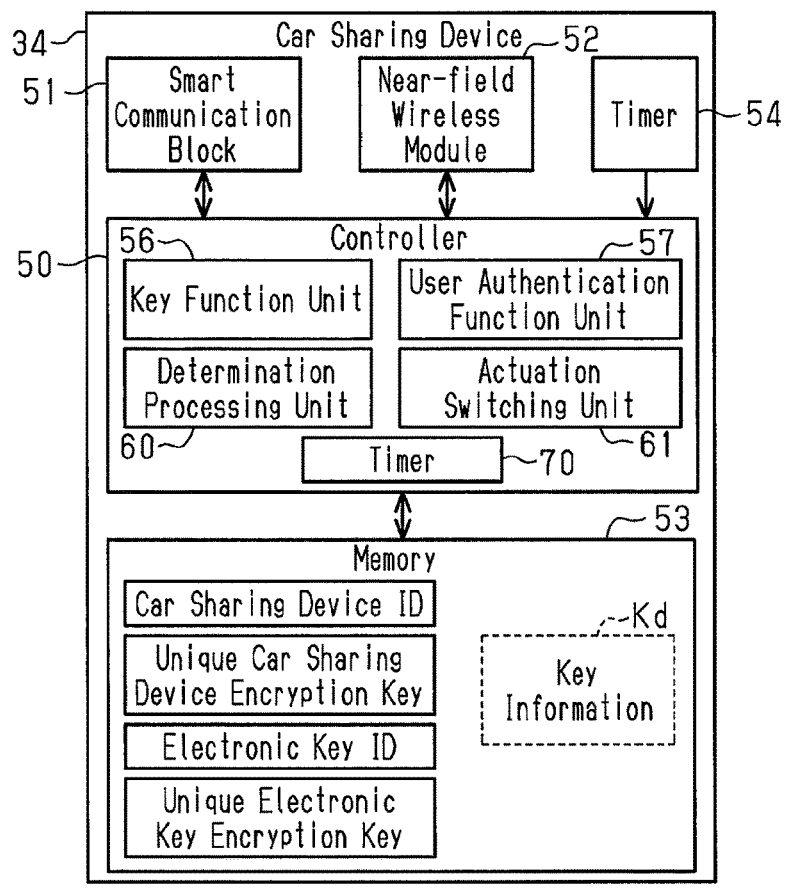
FIG. 6 is a diagram illustrating a second embodiment of a car sharing system.

As illustrated in FIG. 6, the car sharing device 34 includes a timer 70 that starts to measure an elapsed time in response to receiving an unlock request from the mobile terminal 33. In the present example, if the elapsed time from when the unlock request was received has reached a time set in advance for the timer 70, the determination processing unit 60 determines that the condition for permitting actuation of the smart function of the key function unit 56 has been satisfied.

Figure 7:
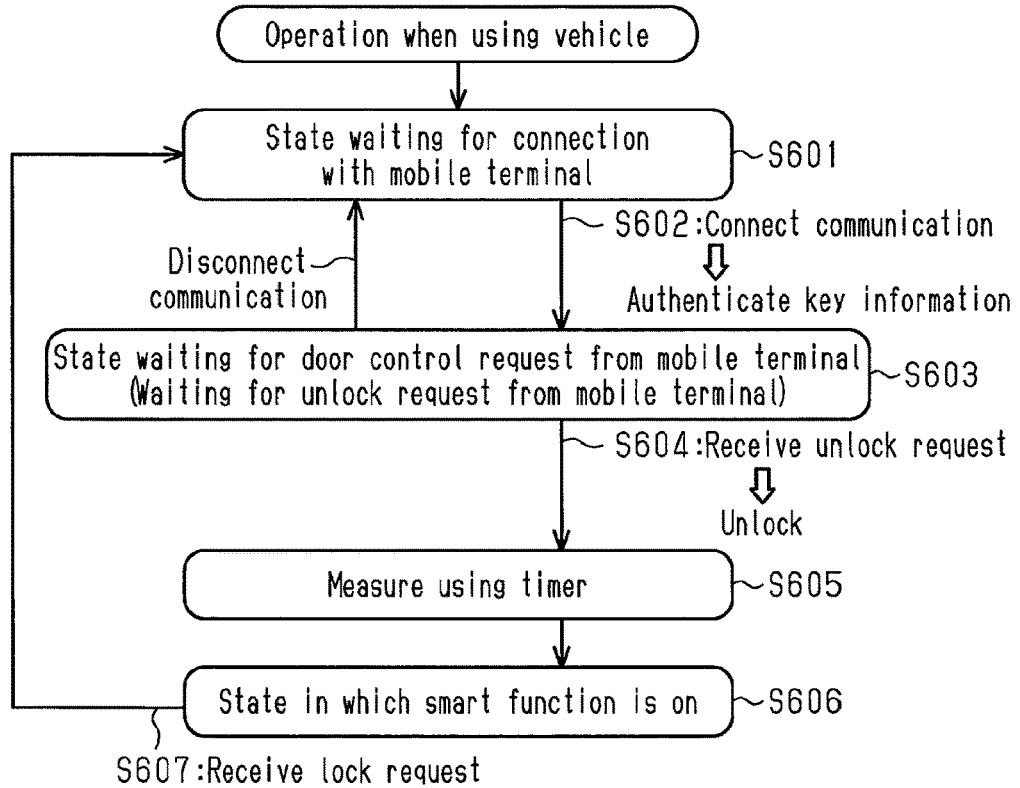
FIG. 7 is a flowchart illustrating an operation sequence that validates the smart function.

FIG. 7 illustrates an operation sequence for validating the smart function of the car sharing device 34 of FIG. 6. Steps S601 to S604 of FIG. 7 are the same as steps S201 to S204 (refer to FIG. 3) of the first embodiment and will thus not be described.

In step S605, the timer 70 starts measuring the elapsed time when the car sharing device 34 receives an unlock request from the mobile terminal 33. Then, the determination processing unit 60 determines whether or not the elapsed time measured by the timer 70 has reached the time set in advance for the timer 70. The time set in advance for the timer 70 may be, for example, an estimated time required for the user to unlock the vehicle door 14, enter the vehicle, sit on the seat, and press the engine switch 28.

In step S606, the determination processing unit 60 determines that the elapsed time measured by the timer 70 has reached the time set in advance for the timer 70. Then, the actuation switching unit 61 activates (validates) the smart function of the key function unit 56. This shifts the car sharing device 34 to the smart communication function valid state and allows the car sharing device 34 to perform ID verification (smart verification) through smart communication with the electronic key system 4 and the verification ECU 9. If the engine switch 28 is operated while the brake is operated when such smart verification is accomplished, the engine 6 is started. Step S607 is the same as step S208 of the first embodiment and will thus not be described.

Thus, in the second embodiment, if the elapsed time measured by the timer 70 when the unlock request was received has reached a predetermined time, the condition for permitting actuation of the smart function is accomplished. Accordingly, there is no need for the user to perform an operation for validating the smart function (for example, engine start request operation with mobile terminal 33 like in the first embodiment). This improves the convenience for the user as compared with the first embodiment.

Third Embodiment

A third embodiment will now be described with reference to FIGS. 8 and 9. The third embodiment is a modified example of the second embodiment. Thus, like or same reference numerals are given to those components that are the same as the corresponding components of the first and second embodiments. Such components will not be described in detail. Instead, only components that differ from those of the first embodiment and the second embodiment will be described in detail.

Figure 8:
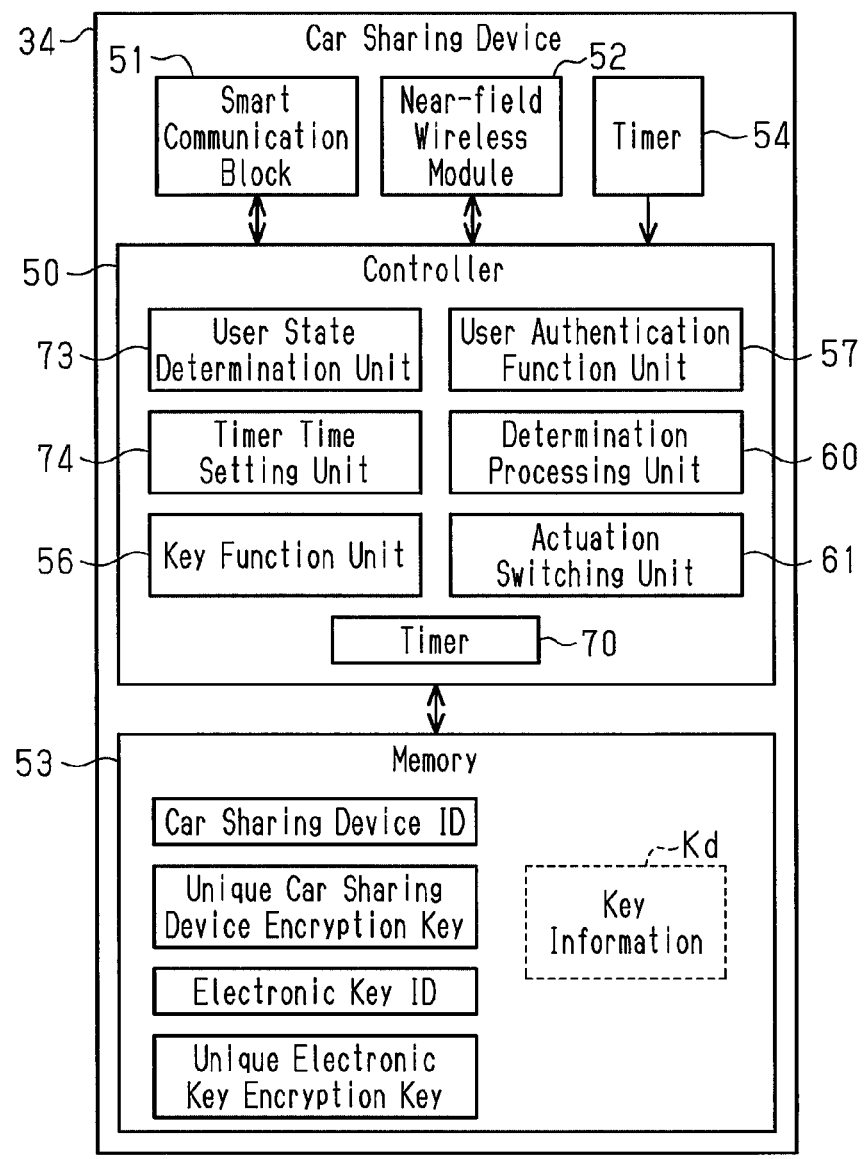
FIG. 8 is a diagram illustrating a third embodiment of a car sharing system.

As illustrated in FIG. 8, the car sharing device 34 includes a user state determination unit 73 and a timer time setting unit 74. The user state determination unit 73 determines a state of a user carrying the mobile terminal 33. The timer time setting unit 74 determines a time set in advance for the timer 70 based on the determination result of the user state determination unit 73. In one non-restrictive example, the user state determination unit 73 and the timer time setting unit 74 are functions implemented by the controller 50 that executes one or more programs stored in a storage area such as the memory 53.

In the present example, the user state determination unit 73 determines the distance between the mobile terminal 33 and the car sharing device 34 as a user state. For example, the user state determination unit 73 measures the received signal strength indicator (RSSI) of radio waves received from the mobile terminal 33 and determines the distance between the mobile terminal 33 and the car sharing device 34 from the measurement value.

In the present example, the timer time setting unit 74 determines a set time of the timer 70 (time set in advance for timer 70) based on the determination result of the user state determination unit 73. For example, when the user state determination unit 73 determines that the user is near the vehicle 1 (for example, determination distance is within predetermined distance), the timer time setting unit 74 sets the set time of the timer 70 to a first time that is relatively short. When the user state determination unit 73 determines that the user is far away from the vehicle 1 (for example, determination distance is not within predetermined distance), the timer time setting unit 74 sets the set time of the timer 70 to a second time that is relatively long. The second time is longer than the first time.

Figure 9:
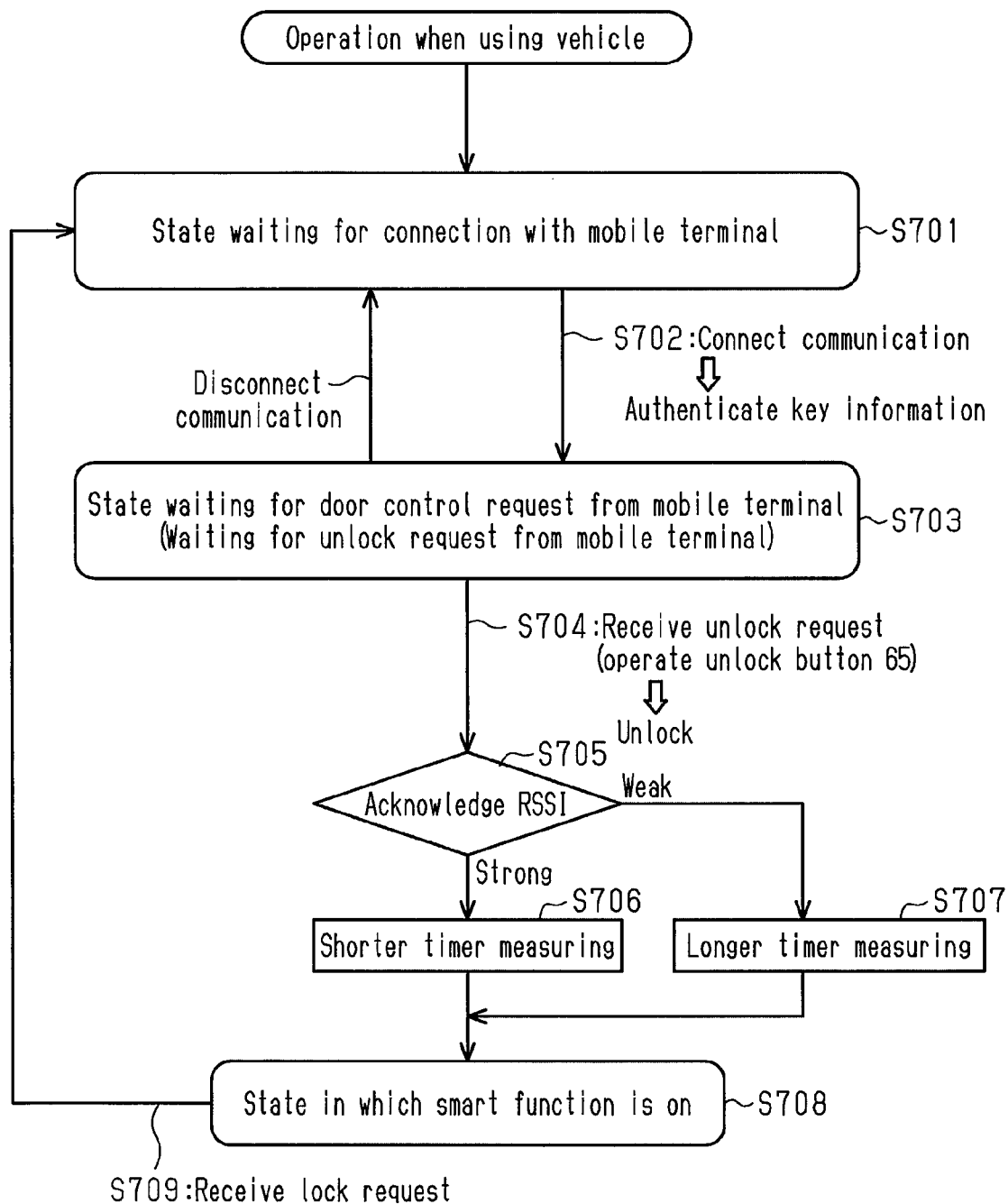
FIG. 9 is a flowchart illustrating an operation sequence that validates the smart function.

FIG. 9 illustrates an operation sequence for validating the smart function of the car sharing device 34 of FIG. 8. Steps S701 to S704 of FIG. 9 are the same as steps S201 to S204 (refer to FIG. 3) of the first embodiment and will thus not be described.

In step S705, the user state determination unit 73 determines the user state when the vehicle door 14 is unlocked. As described above, the user state determination unit 73 determines the user state based on, for example, the RSSI. The user state determination unit 73 does not have to determine the distance between the mobile terminal 33 and the car sharing device 34 based on the RSSI and may output an acknowledgement result of the RSSI as the user state. For example, when strength of the radio waves of the mobile terminal 33 received by the near-field wireless module 52 is high (for example, RSSI is greater than or equal to threshold value), the user state determination unit 73 outputs a first determination result. In this case, the process proceeds to step S706. When the strength of the radio waves of the mobile terminal 33 received by the near-field wireless module 52 is low (for example, RSSI is less than threshold value), the user state determination unit 73 outputs a second determination result. In this case, the process proceeds to step S707.

In step S706, the timer time setting unit 74 sets the timer 70 to the first time. When the RSSI is high (reception radio wave strength is high), it is estimated that the user is near the vehicle 1. Thus, the timer time setting unit 74 sets the timer 70 to a relatively short time (first time). In this case, the timer 70 continues to measure the elapsed time when the unlock request was received until reaching the first time.

In step S707, the timer time setting unit 74 sets the timer 70 to the second time. When the RSSI is low (reception radio wave strength is low), it is estimated that the user is far away from the vehicle 1. Thus, the timer time setting unit 74 sets the timer 70 to a relatively long time (second time). In this case, the timer 70 continues to measure the elapsed time when the unlock request was received until reaching the second time.

In step S708, the determination processing unit 60 determines that the elapsed time measured by the timer 70 has reached the set time (first time or second time). Then, the actuation switching unit 61 activates (validates) the smart function of the key function unit 56. This shifts the car sharing device 34 to the smart communication function valid state and allows the car sharing device 34 to perform ID verification (smart verification) through smart communication with the electronic key system 4 and the verification ECU 9. If the engine switch 28 is operated while the brake is operated when such smart verification is accomplished, the engine 6 is started. Step S709 is the same as step S208 of the first embodiment and will thus not be described.

Thus, in the third embodiment, the set time of the timer 70 is adjusted in accordance with the distance between the mobile terminal 33 and the car sharing device 34 (or in accordance with acknowledgement result of RSSI). Accordingly, the set time of the timer 70 (time until smart function is validated) is optimized in correspondence with a timing the user operates the vehicle 1. This is further advantageous for improving the convenience for the user.

Fourth Embodiment

A fourth embodiment will now be described with reference to FIG. 10. The fourth embodiment is a modified example of the first embodiment. Thus, like or same reference numerals are given to those components that are the same as the corresponding components of the first embodiment. Such components will not be described in detail. Instead, only components that differ from those of the first embodiment will be described in detail.

Figure 10:
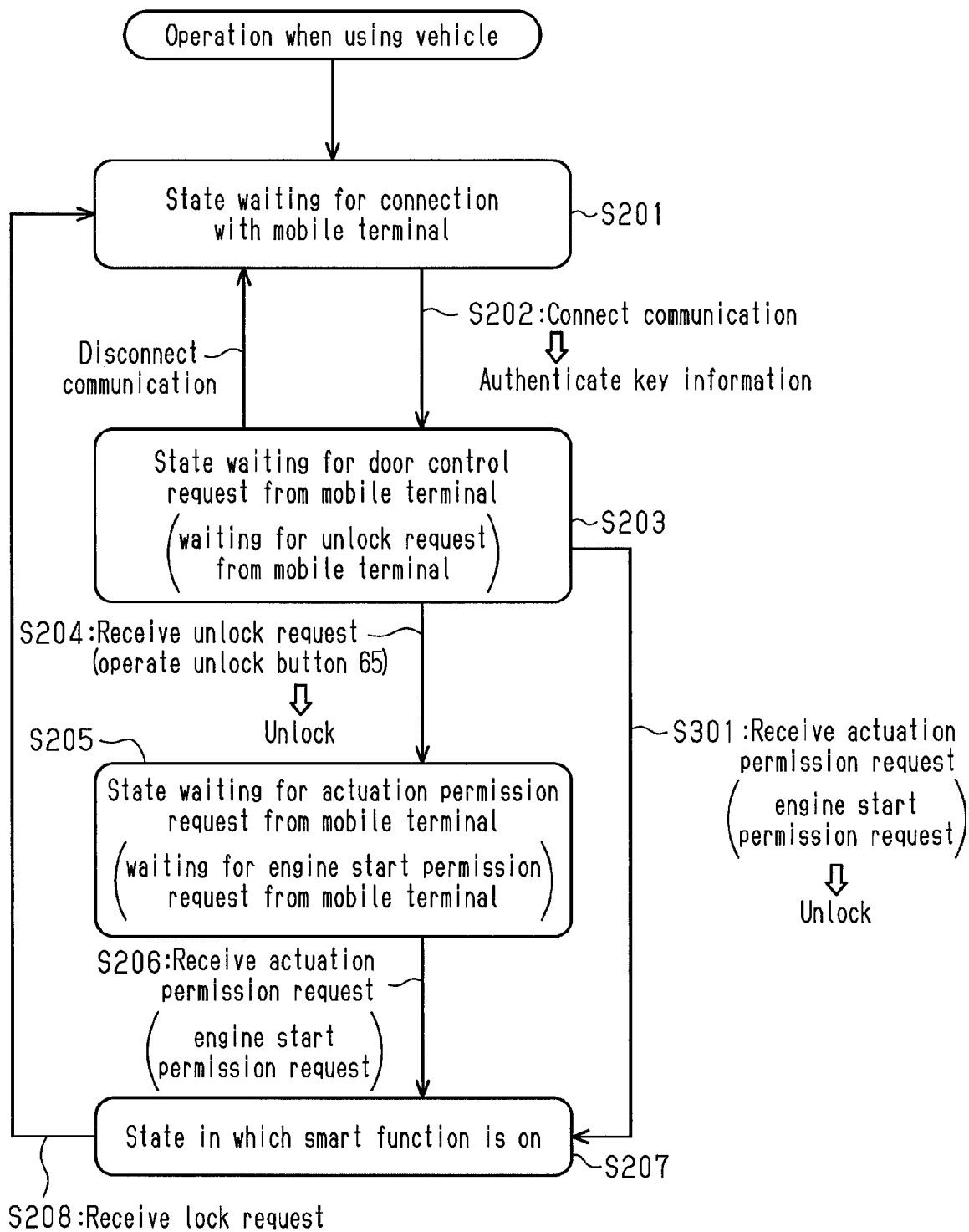
FIG. 10 is a flowchart illustrating an operation sequence that validates the smart function in a fourth embodiment.

In the fourth embodiment, as illustrated in FIG. 10, in step S301, when the car sharing device 34 receives an engine start permission request from the mobile terminal 33 in a state in which the vehicle door 14 of the vehicle 1 is locked, the determination processing unit 60 determines that the condition for permitting actuation of the smart function has been satisfied. In this case, the actuation switching unit 61 validates (activates) the smart function and switches the vehicle door 14 from the lock state to the unlock state. In this manner, when the car sharing device 34 receives the engine start permission request from the mobile terminal 33 in the state in which vehicle door 14 is locked, the engine start permission request is used as an unlock request in addition to being used to validate the smart function.

For example, to enter the vehicle 1 of which the engine 6 is stopped and the vehicle door 14 is locked, the user operates the mobile terminal 33 from outside the vehicle 1 so that the mobile terminal 33 transmits an engine start permission request. When the engine start permission request is received by the car sharing device 34, the determination processing unit 60 determines that the condition for permitting actuation of the smart function has been accomplished. Based on the determination result of the determination processing unit 60, the actuation switching unit 61 unlocks the vehicle door 14 while validating the smart function (step S301).

Thus, when the user enters the vehicle 1, only the operation for transmitting the engine start permission request from the mobile terminal 33 (only a single action) allows the vehicle door 14 to be unlocked while validating the smart function of the vehicle 1. This further improves the convenience for the user. Normally, under a situation in which the user transmits the engine start request from the mobile terminal 33, the user is most likely already near the vehicle 1. This limits situations in which a thief would be able to drive the vehicle 1 away.

It should be apparent to those skilled in the art that the foregoing embodiments may be implemented in many other specific forms without departing from the scope of this disclosure. Particularly, it should be understood that the foregoing embodiments may be implemented in the following forms.

The method for operating the onboard device 3 is not limited to the method described in each of the above embodiments. For example, the method for locking and unlocking the vehicle door 14 is not limited to operating of the mobile terminal 33. For example, the vehicle door 14 may be locked by pressing a lock button of an exterior door handle, and the vehicle door 14 may be unlocked by touching the exterior door handle. In addition, the method for starting the engine 6 is not limited to operating of the engine switch 28 while the brake is operated. For example, the engine 6 may be started by pressing the engine start button displayed on the mobile terminal 33.

In each of the above embodiments, whenever sharing of the vehicle 1 is started or whenever the engine 6 is started, when determined that the condition for validating the smart function has been satisfied, the determination processing unit 60 and the actuation switching unit 61 does not have to perform a series of processes to validate the smart function. For example, the series of processes may be performed whenever the user uses the vehicle 1 (enter vehicle 1).

The condition for permitting actuation of the smart function is not limited to the example described in each of the embodiments and may be changed to any of various conditions.

In each of the embodiments, a time limit may be set for the valid period of the smart function.

In the third embodiment, for example, when an acceleration sensor is arranged in the mobile terminal 33, the distance between the vehicle 1 and the mobile terminal 33 may be determined by the output of the acceleration sensor. For example, when motion of the mobile terminal 33 is detected based on the output of the acceleration sensor, the user state determination unit 73 determines that the user is moving toward the vehicle 1. In this case, the timer time setting unit 74 sets the timer 70 to the relatively long time (second time). When motion of the mobile terminal 33 is not detected, the user state determination unit 73 determines that the user has moved sufficiently close to the vehicle 1 and is standing in front of the vehicle door 14. In this case, the timer time setting unit 74 sets the timer 70 to the relatively short time (first time).

In the third embodiment, the user state determination unit 73 may determine how close the mobile terminal 33 has moved to the vehicle 1 using, for example, a captured image of a camera.

In the third embodiment, the timer 70 does not have to set a set time in accordance with the distance between the mobile terminal 33 and the car sharing device 34. For example, the set time of the timer 70 may be updated for every predetermined distance width (for example, distance of ten centimeters).

In each of the embodiments, the determination processing unit 60 and the actuation switching unit 61 do not have to be arranged in the car sharing device 34 and may be arranged in a device other than the car sharing device 34. For example, the determination processing unit 60, which determines whether or not the condition for permitting actuation of the smart function has been satisfied, and the actuation switching unit 61, which switches the smart function between valid and invalid states, may be arranged in a device other than the car sharing device 34. The same applies to the user state determination unit 73.

In each of the embodiments, the key information Kd does not have to be encrypted by a unique car sharing device encryption key and may be encrypted by another encryption key.

The content of key information Kd may be changed to a content other than that of each embodiment.

The content of authenticating (authentication of key information Kd) of step S104 is not limited to the example described in each of the above embodiments.

In each of the embodiments, the key information Kd does not have to be generated by the server and may be generated by other external devices.

In the electronic key system 4 (smart verification system) of each of the embodiments, the position of the electronic key 2 does not have to be determined using the exterior transmitter 16 and the interior transmitter 17. For example, the electronic key system 4 may determine whether the electronic key 2 is located inside or outside the vehicle by arranging LF antennas on the left and right sides of the vehicle body and checking responses from the electronic key 2 when radio waves are transmitted from each LF antenna.

In each of the embodiments, the electronic key system 4 may be, for example, a wireless key system in which ID verification is performed in response to communication from the electronic key 2.

In each of the embodiments, the electronic key 2 is not limited to a Smart Key (registered trademark) and may be a wireless key.

In each of the embodiments, near-field wireless communication is not limited to Bluetooth communication and may be changed to other communication modes.

In each of the embodiments, the communication modes and frequencies used for each communication is not limited to the examples described in each embodiment and may be changed.

In each of the embodiments, the ID verification used in the electronic key system 4 is not limited to ID verification including challenge response authentication. Instead, as long as at least verification of an electronic key ID is performed, any authentication and verification may be performed.

In each of the embodiments, the key information Kd is not limited to a one-time key and only needs to restrict use of the key information Kd.

In each of the embodiments, the encryption key used for encryption communication may be, for example, any one of a unique car sharing device encryption key, a user authentication key, and a unique electronic key encryption key. Further, the encryption key that is used is not limited to that described in the above embodiments.

For example, the used encryption key can be switched during processing to improve the communication security.

In each of the embodiments, there is no limitation to the location where the car sharing device 34 is installed.

In each of the embodiments, the mobile terminal 33 is not limited to a smartphone and may be replaced by any of a variety of terminals.

It is preferred that the encryption communication executed between the key function unit 56 and the electronic key system 4 when the car sharing system 31 performs ID verification be functionally separated from the encryption communication executed between the user authentication function unit 57 and the mobile terminal 33 when the vehicle 1 is operated with the mobile terminal 33. In this configuration, even if the encryption key used in one of the two types of encryption communication is stolen, the encryption key cannot be used for the other one of the two types of encryption communication. This improves security when using the vehicle.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

The invention claimed is:

1. A car sharing system, comprising:
an electronic key system, which includes
an electronic key for a vehicle, and
a verification ECU installed in the vehicle to perform ID verification of the electronic key through bidirectional short-range wireless communication, wherein the verification ECU allows an onboard device to be operated by the electronic key when the ID verification is accomplished;
a car sharing device installed in the vehicle, wherein the car sharing device performs wireless communication with a mobile terminal that can be actuated as a vehicle key of the vehicle by registering key information, authenticates the key information through the wireless communication, and performs the ID verification via the verification ECU in a state in which the key information has been authenticated;
a key function controller arranged in the car sharing device to implement a smart function, wherein when the smart function of the key function controller is validated, the verification ECU performs the ID verification through bidirectional short-range wireless communication with the car sharing device and allows the onboard device to be operated by the mobile terminal when the ID verification is accomplished between the verification ECU and the car sharing device;
a determination processor that determines whether or not a condition for permitting actuation of the smart function has been satisfied based on the mobile terminal being operated after the authentication of the key information is accomplished; and
an actuation switch that validates the smart function when the determination processor determines that the condition for permitting actuation of the smart function has been satisfied based on the mobile terminal being operated after the authentication of the key information is accomplished.

2. The car sharing system according to claim 1, wherein the car sharing device is connected through wireless communication to the electronic key system and not wire-connected to the electronic key system.

3. The car sharing system according to claim 1, wherein whenever sharing of the vehicle is started or whenever an engine of the vehicle is started, the determination processor and the actuation switch perform a series of processes to determine whether or not the condition for permitting actuation of the smart function has been satisfied and validate the smart function when the condition has been satisfied.

4. The car sharing system according to claim 1, wherein if the car sharing device receives an actuation permission request from the mobile terminal that requests for actuation permission of the onboard device when a vehicle door of the vehicle is in an unlock state, the determination processor determines that the condition for permitting actuation of the smart function has been satisfied.

5. The car sharing system according to claim 4, wherein the actuation permission request is an engine start permission request that requests an engine of the vehicle to be started.

6. The car sharing system according to claim 1, wherein the car sharing device further includes a timer that starts to measure an elapsed time in response to receiving an unlock request of the vehicle door from the mobile terminal, and
the determination processor determines that the condition for permitting actuation of the smart function has been satisfied if the elapsed time from when the unlock request was received has reached a time set in advance to the timer.

7. The car sharing system according to claim 6, further comprising:
a user state determiner that determines a state of a user carrying the mobile terminal; and
a timer time setter that sets a time of the timer based on a determination result of the user state determiner.

8. The car sharing system according to claim 1, wherein when the car sharing device receives an engine start permission request from the mobile terminal that requests an engine of the vehicle to be started when a vehicle door of the vehicle is in a lock state, the determination processor determines that the condition for permitting actuation of the smart function has been satisfied, and
when the car sharing device receives the engine start permission request when the vehicle door is in the lock state, the actuation switch switches the vehicle door from the lock state to an unlock state and validates the smart function.

9. The car sharing system according to claim 1, wherein the determination processor determines that the condition for permitting actuation of the smart function has been satisfied when the car sharing device receives an actuation permission request from the mobile terminal that requests for actuation permission of a particular one of onboard devices of the vehicle.

10. A car sharing system, comprising:
a car sharing device installed in a vehicle, wherein the car sharing device performs wireless communication with a mobile terminal that can be actuated as a vehicle key of the vehicle by registering key information, authenticates the key information through the wireless communication, and performs ID verification via an electronic key system of the vehicle in a state in which the key information has been authenticated to allow an onboard device to be operated by the mobile terminal;
a key function controller arranged in the car sharing device, wherein the key function controller implements a smart function to perform the ID verification through bidirectional short-range wireless communication with the electronic key system;
a determination processor that determines whether or not a condition for permitting actuation of the smart function has been satisfied based on the mobile terminal being operated after the authentication of the key information is accomplished; and
an actuation switch that validates the smart function when the determination processor determines that the condition for permitting actuation of the smart function has been satisfied based on the mobile terminal being operated after the authentication of the key information is accomplished,
wherein the determination processor determines that the condition for permitting actuation of the smart function has been satisfied when the car sharing device receives an actuation permission request from the mobile terminal that requests for actuation permission of a particular one of onboard devices of the vehicle.

* * * * *